(12) United States Patent
van Belzen et al.

(10) Patent No.: US 7,824,565 B2
(45) Date of Patent: Nov. 2, 2010

(54) UREA COMPOSITION HAVING REDUCED COMPRESSIBILITY, CAKE FORMATION AND DUST FORMATION, AND PROCESS FOR ITS PREPARATION

(75) Inventors: Ruud van Belzen, Middleburg (NL); Luc Vanmarcke, Lembeke (BG); Erik Bijpost, Nieuwegein (NL); John van der Hoeven, Utrecht (NL)

(73) Assignee: Yara International ASA, Oslo (NO)

( * ) Notice: Subject to any disclaimer, the term of this patent is extended or adjusted under 35 U.S.C. 154(b) by 388 days.

(21) Appl. No.: 11/795,258

(22) PCT Filed: Jan. 16, 2006

(86) PCT No.: PCT/NL2006/000023

§ 371 (c)(1), (2), (4) Date: Oct. 18, 2007

(87) PCT Pub. No.: WO2006/091077

PCT Pub. Date: Aug. 31, 2006

(65) Prior Publication Data

US 2008/0190161 A1  Aug. 14, 2008

(30) Foreign Application Priority Data

Jan. 14, 2005 (NL) .................... 1028019
Feb. 4, 2005 (NL) .................... 1028198

(51) Int. Cl.
*C05C 9/00* (2006.01)
*B01D 9/02* (2006.01)
*C08K 5/29* (2006.01)

(52) U.S. Cl. .................. 252/1; 23/295 R; 71/28; 71/64.03; 71/64.12; 252/88.1; 524/195; 524/211

(58) Field of Classification Search ........... 71/11, 71/27, 28, 29, 30, 64.12, 64.03; 252/1, 88.1; 23/295 R; 524/195, 211
See application file for complete search history.

(56) References Cited

U.S. PATENT DOCUMENTS

| | | | |
|---|---|---|---|
| 5,766,302 A | | 6/1998 | Lefroy et al. |
| 6,562,941 B2 * | | 5/2003 | Ma .................. 528/363 |
| 2004/0035162 A1 * | | 2/2004 | Williams et al. ........ 71/28 |
| 2007/0131011 A1 * | | 6/2007 | Bijpost et al. ........... 71/28 |
| 2008/0041131 A1 * | | 2/2008 | Van Belzen et al. ..... 71/64.12 |

FOREIGN PATENT DOCUMENTS

| | | |
|---|---|---|
| GB | 1 479 455 | 7/1977 |
| JP | 52-068715 | 6/1977 |
| JP | 08-225387 | 9/1996 |
| WO | 98/30100 | 7/1998 |
| WO | WO 0220471 A2 * | 3/2002 |

* cited by examiner

*Primary Examiner*—Wayne Langel
*Assistant Examiner*—Syed Iqbal
(74) *Attorney, Agent, or Firm*—Wenderoth, Lind & Ponack, L.L.P.

(57) ABSTRACT

Colorfast urea composition having reduced compressibility, cake formation and tendency of re-crystallization of the urea granulate, wherein the granulate further contains at least two different biodegradable polymers, of which at least one polymer is preferably a polyalkenyl amine compound. The other polymer is preferably polyaspartic acid or polyvinyl alcohol. The invention further relates to a process for the preparation of such a urea composition.

14 Claims, No Drawings

UREA COMPOSITION HAVING REDUCED COMPRESSIBILITY, CAKE FORMATION AND DUST FORMATION, AND PROCESS FOR ITS PREPARATION

INTRODUCTION

It is common knowledge that urea granulates are subject to crushing during production, storage and transport. Up to 25% b.w. of the urea granulate may be crushed when the urea granulate is stored or transported by ship at a relatively high temperature of, for example, more than 40° C. Although the urea granulate as such absorbs little moisture and is in fact per se not sensitive to caking, high percentages of crushed granules result in dust problems with a strong tendency of caking.

Besides, the problem of caking of granules occurs in particular during transport of bulk amounts of urea in tropical areas, due to migration of residual moisture from the granules as a result of the pressure being present at the bottom of the bulk amount of urea.

It is also known that a number of chemical compositions can be used as additive to improve the crushing strength, the tendency of caking and the resistance against moisture.

Formaldehyde, hexamethylene tetramine and formaldehyde/urea condensation products can be added as improvers of the crushing strength, while the combination of poly(vinyl acetate)/surfactant (see U.S. Pat. No. 4,812,158) is used to reduce the tendency of caking. However, these additives must be added in relatively large amounts, or the poisonous properties thereof make them difficult to handle. Moreover, the presence of a surfactant component, such as in the combination of poly(vinyl acetate)/surfactant, results in a larger foam formation when the urea is used in industrial applications, such as the resin production, while formaldehyde derivatives are unsuitable in the case of melamine production.

There is also an important difference with respect to the way of adding the additives. Formaldehyde derivatives as well as the compositions according to the invention are mixed with an urea melt. However, the combination of polyvinyl acetate/surfactant is sprayed on a preformed granule.

GB-A-1 217 106 describes a process for reducing the caking of urea by using a poly(vinyl alcohol) having a high molecular weight as an additive to prevent caking. More particularly, according to this process, an aqueous solution of the additive is mixed with an aqueous solution of urea. Preferably, an amount of additive of 0.005 to 5% b.w., based on the weight of the urea, is admixed. The concentration of the aqueous urea solution is initially 80%, according to the given example; after admixing the solution of the additive, concentration up to 95% takes place at increased temperature, after which one lets the urea crystallize by cooling. Practice has learned that the presence of polyvinyl alcohol in urea results in dust formation, probably as a result of internal moisture migration.

WO02/20471 mentions a process wherein a combination of a polyvinyl compound and inorganic salts are mixed with a urea melt. The crushing strength as well as the impact resistance of the obtained granulate prove to be improved in comparison with untreated urea. Besides, the compressibility of the urea proved to be decreased considerably. This last observation could be an advantage because the urea granulates will be less sensitive to deformation during storage. However, adding inorganic salts, such as aluminium sulphate, in urea results in a strong decrease of the pH when dissolving the urea in water. This is a great disadvantage in the use of this urea for technical applications, such as the production of resins.

U.S. Pat. No. 4,063,919 describes a fertilizer composition containing a polyvinyl alcohol polymer, and a plasticizer for the polyvinyl alcohol, wherein this plasticizer is preferably chosen from glycerol, sorbitol, glycol, polyglycols having 4-20 C-atoms, and mixtures thereof. Additionally, mannitol and sucrose are mentioned as plasticizers in this publication. Although sorbitol, mannitol and sucrose are sugars, they are referred to as polyglycols in this publication. It is a disadvantage that sugars will colour at higher temperatures (>100° C.), the so-called caramelizing. Also the presence of small polar compounds may result in higher hygroscopicity of urea, as a result of which re-crystallization can take place and consequently the dust formation will increase drastically.

U.S. Pat. No. 5,766,302 mentions compositions of a fertilizer, such as urea, a polyvinyl alcohol, and an alkali metal lignosulfonate. However, it is commonly known to the expert, that lignosulfonates give urea a brown colour. This is not desired in many applications of urea, for example in the production of melamine. In the compositions according to the invention, the lignosulfonates are therefore excluded; the compositions according to the invention, on the other hand, are colourfast because they are, as is assumed, inert to urea and/or thermal decomposition and therefore do not give any colouring reaction.

OBJECT OF THE INVENTION

Therefore, it is an object of the invention to provide a urea composition having a low compressibility, low tendency of cake formation as well as low moisture sensitivity and with which the above-mentioned disadvantages are overcome.

DESCRIPTION OF THE INVENTION

Applicant found, surprisingly, that the addition to the urea melt of at least two different polymers, of which at least one is a poly-alkenyl compound, results in a significant decrease of the compressibility and the tendency of caking of the urea granulate formed thereafter. Moreover, the urea granulate is not sensitive to re-crystallization by moisture absorption during storage and handling. The polymers can either be added separately to the molten urea or together with the polyalkenyl compound, whether or not as an aqueous mixture or solution. According to a preferred embodiment, the total added amount of the polymer mixture is at most 10% b.w., based on the total amount of urea. The present use relates to an intimate mixture of urea, a first polymer in the form of a polyalkenyl compound and a second polymer containing hydroxyl, carboxylic acid, amine and/or amide groups, causing the tendency of caking, the compressibility and dust formation by re-crystallization of the composition to be substantially lower than of untreated urea and known forms of treatment. Preferably, the first polymer particularly is a polyalkenyl compound, such as a polyalkenyl amine, preferably a polyvinyl amine, polyvinyl formamide or polyallyl amine, while the second polymer preferably is polyvinyl alcohol or polyaspartic acid.

The new additive according to this invention preferably is a mixture of a nitrogen containing polyalkenyl compound with the general formula $(C-CX)_n(C-CY)_m$, wherein n=2 to 2,000,000 and m=0 to 2,000,000 and wherein X and Y, independently of each other, are part of the group consisting of $NH_2$, $(CH_2)_nNH_2$, $NH_2 \cdot HCl$, $(CH_2)_nNHR$, $(CH_2)_nNH_2 \cdot HCl$, $NH-HC=O$, $NH-RC=O$, while Y can further be H, wherein R consist of alkyl or alkenyl having 1-30 C-atoms and n=1 to 5. These polymers are preferably mixed with polyaspartic acid or a polyvinyl compound with the general formula of $(CHX-CHY)_n$, wherein n is an integer from 4 to 10,000 and X and Y, independently of one another, are chosen from a hydrogen atom, a carboxylic acid-, ester-, hydroxyl-, amine- and amide group, preferably a polyvinyl alcohol.

The dose of the different, biodegradable polymers is from 50-10,000 ppm, preferably 500-3,000 ppm, based on the weight of the urea, wherein water is preferably used as a solvent. The temperature at which the treatment is performed, is usually from 10-160° C., preferably at 80-140° C.

Further preferred embodiments are reflected in the subclaims.

Granulation additives for urea on the basis of polyvinyl compounds $(CHX-CHY)_n$ are claimed by the Applicant in WO02/20471.

In the PCT publication WO02/20471 it has been reported that polyaspartic acid does not offer a considerable improvement to the hardness of urea.

Surprisingly, Applicant has now found that the combination of at least two specific polymers has a synergetic effect on the physical properties of urea.

Moreover, adding polyaspartic acid to urea is interesting, because this biopolymer may increase the productivity of plants (see U.S. Pat. No. 5,861,356).

Advantages of polyvinyl alcohols, polyalkenyl amines and polyaspartic acid are the good biodegradability, relatively low toxicity and good miscibility with water. Use of these products as granulation additive for urea will result in a much lower burden to the environment relative to the current situation, which gives toxic formaldehyde products.

The invention therefore relates to a urea composition as defined in the accompanying claims, which composition has a reduced compressibility, tendency of cake formation and dust formation by re-crystallization, compared with a usual urea composition.

The invention will be explained below with a number of examples, with the use of a method which is representative for the production and testing of the quality of the urea granulate formed. These examples exclusively serve to explain and not to limit the claimed protective scope of the present invention.

Preparation Method

An aqueous solution of the additive (with the concentrations given in the examples) was added to a urea melt consisting of 99.7% w/w of urea p.a. and 0.3% w/w of water. Thereafter, the urea pellets were formed by separately dropping the molten urea drops from a height of 1 cm onto a glass plate. After solidifying, the pellets were scraped from the glass plate and the fine dust was removed by means of a sieve. The pellets were collected and kept in an air tight flask until the compressibility and tendency of cake formation were measured.

Process for Determining the Compressibility and Cake Formation

A transparent round tube with an internal diameter of 3 cm was filled with 40 g of urea pellets. On top of that, a plunger was arranged, causing a pressure of about 600 kPa to be exerted on the sample. Directly after applying the overpressure and again after 24 hours, the height of the urea column was measured. The relative difference in height, which is a measure for the compressibility, was calculated from these two values ($\Delta$ height (%)).

The degree of cake formation can be determined by measuring the breaking strength of the compressed urea sample.

Process for Determining the Degree of Re-crystallization by Moisture Absorption

A Petri dish with a diameter of about 8.5 cm was filled with 15.0 g urea pellets. This was subsequently placed in a climate chamber with a relative air humidity of 80% and a temperature of 20° C. After 24 hours, the increase in weight as a result of moisture absorption by the granulate was measured, after which the Petri dish was closed with the corresponding cover. The dish was put aside in the dark at room temperature. After two weeks, the content of the dish was examined by looking at the granulate under a loupe.

The abbreviation ghk stands for no re-crystallization, whereas hk stand for re-crystallization after moisture absorption and drying.

EXAMPLE 1

A number of polymers were tested as granulation additive for urea as a solution or mixture in water. The polymers are shown in Table 1. The results obtained with the aqueous solutions are presented in Table 2.

TABLE 1

| Active compound | Dissolved percentage (w/w %) | Molecular mass (gram/mol) | Degree of hydrolysis (%) |
|---|---|---|---|
| Polyvinyl alcohol | 12 | ±15,000 | >80 |
| Polyallyl amine | 10 | ±15,000 | — |
| Polyallyl amine HCl salt | 50 | ±15,000 | — |
| Polyallyl amine/ diallyl amine copolymer | 40 | ±70,000 | — |
| Polyvinyl amine 1 | 45 | ±10,000 | >90 |
| Polyvinyl amine 2 | 36 | ±45,000 | >90 |
| Polyvinyl amine 3 | 30 | ±340,000 | >90 |
| Polyvinyl formamide | 22 | ±340,000 | 30 |
| Polyaspartic acid | 40 | ±2,500 | — |

TABLE 2

| Raw material | Dose (ppm) | Compressibility (%) | Tendency of cake formation (N) | Appearance after moisture absorption |
|---|---|---|---|---|
| Blank | 0 | 10 | 9.0 | ghk |
| Urea-formaldehyde (80%) | 3000 | 2 | 0.7 | ghk |
| Polyvinyl alcohol (aq) | 1000 | 5 | 3.8 | hk |
| Polyallyl amine | 1000 | 3 | 5.7 | hk |
| Polyallyl amine HCl salt | 1000 | 5 | 4.3 | hk |
| Polyallyl amine/ diallyl amine copolymeer | 1000 | 4 | 3.9 | hk |
| Polyvinyl amine 1 | 1000 | 5 | 0.8 | ghk |
| Polyvinyl amine 2 | 1000 | 7 | 3.9 | ghk |
| Polyvinyl amine 3 | 1000 | 5 | 3.1 | ghk |
| Polyvinyl formamide | 1000 | 5 | 7.0 | ghk |
| Polyaspartic acid | 1000 | 11 | 8.5 | ghk |

It can be concluded from the above table that almost all tested polymers have a positive influence on reduction of the compressibility and the cake formation. There are also a number of compounds which are able to counteract re-crystallization of urea granulate after moisture absorption. However, the tested compounds can not approach the quality of urea granulate which was treated with urea-formaldehyde.

EXAMPLE 2

Subsequently, several mixtures were composed on the basis of polyvinyl alcohol and polyvinyl amine/polyvinyl formamide. One started from a 12 w/w % solution of polyvinyl alcohol (>80% hydrolysed, molar weight about 15,000 g/mol), to which 5.0 w/w % nitrogen-containing polymer (see Table 1 for the concentrations) was added. The results are shown in Table 3.

TABLE 3

| Polymer | Dose (ppm) | Compressibility (%) | Tendency of cake formation (N) | Appearance after moisture absorption |
|---|---|---|---|---|
| Polyvinyl amine 1 | 1000 | 2 | 0 | hk |
| Polyvinyl amine 2 | 1000 | 2 | 0.1 | hk |
| Polyvinyl amine 3 | 1000 | 3 | 0.5 | ghk |
| Polyvinyl formamide | 1000 | 2 | 0.5 | hk |
| Polyallyl amine | 1000 | 3 | 0.7 | hk |

It can be concluded from the results that there is synergism between polyvinyl alcohol and nitrogen-containing polymers, such as polyvinyl amine, polyvinyl formamide and polyallyl amine, for the preparation of high-quality urea granulate. Use of the combination polyvinyl alcohol and high moleculair weight polyvinyl amine additionally makes urea insensitive to re-crystallization after moisture absorption.

EXAMPLE 3

Since polyaspartic acid can have a favourable influence on plant growth, a number of mixtures on the basis of 80% w/w polyaspartic acid (40% w/w active) and 20% w/w polyvinyl amine, polyvinyl formamide or polyvinyl alcohol (for concentrations, see Table 1) were tested. The results are shown in Table 4.

TABLE 4

| Polymer | Dose of the total mixture (ppm) | Compressibility (%) | Tendency of cake formation (N) | Appearance after moisture absorption |
|---|---|---|---|---|
| Polyvinyl amine 1 | 1000 | 3 | 0.2 | ghk |
| Polyvinyl amine 2 | 1000 | 2 | 0.3 | ghk |
| Polyvinyl amine 3 | 1000 | 2 | 0.6 | ghk |
| Polyvinyl formamide | 1000 | 3 | 0.8 | ghk |
| Polyallyl amine | 1000 | 2 | 0.3 | ghk |
| Polyvinyl alcohol* | 1000 | 3 | 0.9 | hk |

*Polyaspartic acid and a polyvinyl alcohol separately dosed

The above experiment has shown that an additive on the basis of polyaspartic acid and a polar polyalkenyl compound gives urea granulate excellent physical properties.

EXAMPLE 4

It has also been examined whether the addition of three different polymers to the urea melt has a positive effect on the properties of the resulting granulate. In order to examine this, one started from a mixture of 80% w/w polyvinyl alcohol (12% w/w active, >80% hydrolysed) and 20% w/w polyvinyl amine 1 (45% w/w active, >90% hydrolysed). This mixture was added to the urea melt in a dose of 700 ppm. Subsequently, 300 ppm of another type of polymer, mentioned in table 5, was dosed (for concentrations, see Table 1). The results are shown in Table 5.

TABLE 5

| Polymer | Compressibility (%) | Tendency of cake formation (N) | Appearance after moisture absorption |
|---|---|---|---|
| Polyvinyl formamide | 2 | 0.2 | ghk |
| Polyallyl amine | 2 | 0.2 | ghk |
| Polyaspartic acid | 1 | 0 | ghk |

Use of a mixture of three polymers as additive for the production of urea granulate results in high-quality urea granulate.

The invention claimed is:

1. A colorfast urea composition, comprising a mixture of urea and at least two different, biodegradable polymers, of which at least one is a polyalkenyl amine selected from the group consisting of polyvinyl amine, polyvinyl formamide and polyallyl amine.

2. The urea composition according to claim 1, wherein the alkenyl group of the polyalkenyl amine contains 1-6 C-atoms.

3. The urea composition according to claim 2, wherein the alkenyl group of the polyalkenyl amine contains 2-4 C-atoms.

4. The urea composition according to claim 1, wherein the polyalkenyl amine is polyvinyl amine or polyallyl amine.

5. The urea composition according to claim 1, wherein a second polymer is represented by the formula $(CHX-CHY)_n$, wherein n is an integer from 4 to 10,000, and X and Y, independently from one another, are selected from the group consisting of a hydrogen atom, a carboxylic acid-group, an ester-group, a hydroxyl-group, an amine-group, and an amide-group.

6. The urea composition according to claim 1, wherein a second polymer comprises polyvinyl alcohol, having a degree of hydrolysis of $\geq 70\%$.

7. The urea composition according to claim 6, wherein the degree of hydrolysis is $\geq 80\%$.

8. The urea composition according to claim 1, wherein a second polymer is polyaspartic acid.

9. A process for the preparation of a colorfast urea composition according to claim 1, said process comprising:
   mixing a solution of at least two different, biodegradable polymers with urea, in a dose of 50-10,000 ppm, based on the weight of urea, wherein at least one of the at least two biodegradable polymers is a polyalkenyl amine selected from the group consisting of polyvinyl amine, polyvinyl formamide and polyallyl amine, and
   thereafter, removing a solvent in order to obtain the urea composition.

10. The process according to claim 9, wherein the solvent is a polar solvent.

11. The process according to claim 10, wherein the solvent is water.

12. The process according to claim 9, wherein the process is performed at a temperature from 10-160° C.

13. The process according to claim 12, wherein the temperature is 80-140° C.

14. A process for the preparation of a colorfast urea composition according to claim 1, said process comprising:
   mixing a solution of at least two different, biodegradable polymers with urea, in a dose of 500-3,000 ppm, based on the weight of urea, wherein at least one of the at least two biodegradable polymers is a polyalkenyl amine selected from the group consisting of polyvinyl amine, polyvinyl formamide and polyallyl amine, and thereafter, removing a solvent in order to obtain the urea composition.

* * * * *